(12) United States Patent
Wang et al.

(10) Patent No.: US 12,361,649 B2
(45) Date of Patent: Jul. 15, 2025

(54) MARKER GENERATION METHOD AND APPARATUS, AND OBJECT PRESENTATION METHOD AND APPARATUS

(71) Applicant: SHANGHAI BILIBILI TECHNOLOGY CO., LTD., Shanghai (CN)

(72) Inventors: Ruibo Wang, Shanghai (CN); Jiahui Xu, Shanghai (CN); Jian Wang, Shanghai (CN); Yu Yan, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 447 days.

(21) Appl. No.: 17/873,815

(22) Filed: Jul. 26, 2022

(65) Prior Publication Data
US 2023/0035655 A1 Feb. 2, 2023

(30) Foreign Application Priority Data
Jul. 28, 2021 (CN) .......................... 202110857419.9

(51) Int. Cl.
*G06T 19/00* (2011.01)
*G06Q 30/0601* (2023.01)
*G06T 7/73* (2017.01)

(52) U.S. Cl.
CPC ....... *G06T 19/006* (2013.01); *G06Q 30/0643* (2013.01); *G06T 7/74* (2017.01); *G06T 2207/30204* (2013.01)

(58) Field of Classification Search
None
See application file for complete search history.

(56) References Cited

U.S. PATENT DOCUMENTS

| 10,929,670 | B1* | 2/2021 | Troy ................... G06V 20/653 |
| 2011/0117940 | A1* | 5/2011 | Pfaender ............... G06V 10/95 |
| | | | 455/466 |

(Continued)

FOREIGN PATENT DOCUMENTS

| CN | 108369749 A | 8/2018 |
| CN | 112346594 A | 2/2021 |

(Continued)

*Primary Examiner* — Jwalant Amin
(74) *Attorney, Agent, or Firm* — BakerHostetler

(57) ABSTRACT

The present application provides techniques of generating augmented reality resources and corresponding trigger markers. The techniques comprise generating and storing at least one augmented reality resource corresponding to at least one predetermined object; determining that at least one target object comprised in an object order, wherein the at least one target object is among the at least one predetermined object; determining at least one storage address of at least one augmented reality resource corresponding to the at least one target object; and generating, based at least in part on the at least one storage address, a trigger marker corresponding to the object order, wherein the trigger marker is configured to indicate for a client computing device to present at least one augmented reality image of the at least one target object based on the trigger marker.

17 Claims, 6 Drawing Sheets

(56) References Cited

U.S. PATENT DOCUMENTS

| | | | |
|---|---|---|---|
| 2015/0339644 A1* | 11/2015 | Stults | G06Q 30/0601 |
| | | | 705/23 |
| 2020/0005293 A1* | 1/2020 | Opeola | G06Q 20/065 |
| 2020/0037943 A1* | 2/2020 | Chaja | G06F 3/011 |
| 2020/0074743 A1 | 3/2020 | Zheng et al. | |
| 2021/0118235 A1* | 4/2021 | Hou | G06V 20/20 |

FOREIGN PATENT DOCUMENTS

| | | | | |
|---|---|---|---|---|
| CN | 112581629 A | | 3/2021 | |
| CN | 113127126 A | * | 7/2021 | G06F 3/011 |

* cited by examiner

MARKER GENERATION METHOD AND APPARATUS, AND OBJECT PRESENTATION METHOD AND APPARATUS

CROSS REFERENCE TO RELATED APPLICATION

The present application claims priority to Chinese Patent Application No. 202110857419.9, filed on Jul. 28, 2021, which is incorporated herein by reference in its entirety.

BACKGROUND ART

With the rapid development of computer and Internet technologies, people's work and life have become increasingly inseparable from the network, from which users can obtain objects that interest them. In the prior art, after a user obtains a corresponding object, for example, an anime character card or character poster, the user often can see only a planar image of the obtained object. However, content presented by the traditional planar image is too monotonous due to the lack of a sense of three-dimensionality or a dynamic effect. As a result, the user has little interest in and a poor experience of the object, and may return the obtained object, causing a waste of processing resources.

SUMMARY OF THE INVENTION

In view of this, embodiments of the present application provide a marker generation method. The present application also relates to a marker generation apparatus, an object presentation method, an object presentation apparatus, a computing device, and a computer-readable storage medium, to resolve problems of monotonous presented content, a poor user experience, and a waste of processing resources in the prior art.

According to a first aspect of the embodiments of the present application, a marker generation method is provided, the method including:
- generating and storing an augmented reality resource for a preset object;
- determining a target object included in an object order and a storage address of an augmented reality resource for the target object; and
- generating, based on the storage address of the augmented reality resource for the target object, a preset trigger marker corresponding to the object order, where the preset trigger marker is used as an indication for a client to present an augmented reality image of the target object based on the preset trigger marker.

According to a second aspect of the embodiments of the present application, an object presentation method is provided, the method including:
- in response to scanning a preset trigger marker corresponding to an object order, sending an obtaining request for an augmented reality resource set, and receiving a returned target augmented reality resource set, where the target augmented reality resource set is a set including augmented reality resources for all target objects in the object order;
- in response to a scan operation on a first object, obtaining a first augmented reality resource for the first object from the augmented reality resource set, where the first object is any one of the target objects; and
- synthesizing and presenting an augmented reality image of the first object based on the first object and the first augmented reality resource.

According to a third aspect of the embodiments of the present application, a marker generation apparatus is provided, the apparatus including:
- a first generation module configured to generate and store an augmented reality resource for a preset object;
- a determination module configured to determine a target object included in an object order and a storage address of an augmented reality resource for the target object; and
- a second generation module configured to generate, based on the storage address of the augmented reality resource for the target object, a preset trigger marker corresponding to the object order, where the preset trigger marker is used as an indication for a client to present an augmented reality image of the target object based on the preset trigger marker.

According to a fourth aspect of the embodiments of the present application, an object presentation apparatus is provided, the apparatus including:
- a first obtaining module configured to: in response to scanning a preset trigger marker corresponding to an object order, send an obtaining request for an augmented reality resource set, and receive a returned target augmented reality resource set, where the target augmented reality resource set is a set including augmented reality resources for all target objects in the object order;
- a second obtaining module configured to: in response to a scan operation on a first object, obtain a first augmented reality resource for the first object from the augmented reality resource set, where the first object is any one of the target objects; and
- a presentation module configured to synthesize and present an augmented reality image of the first object based on the first object and the first augmented reality resource.

According to a fifth aspect of the embodiments of the present application, a computing device is provided, the computing device including:
- a memory and a processor,
- where the memory is configured to store computer-executable instructions, and the processor is configured to execute the computer-executable instructions to implement the operation steps of any one of the marker generation method or the object presentation method.

According to a sixth aspect of the embodiments of the present application, a computer-readable storage medium storing computer-executable instructions is provided, where when the computer-executable instructions are executed by a processor, the operation steps of any one of the marker generation method or the object presentation method are implemented.

According to the marker generation method provided by the present application, an augmented reality resource for a preset object may be first generated and stored; a target object included in an object order and a storage address of an augmented reality resource for the target object are then determined; and a preset trigger marker corresponding to the object order may be then generated based on the storage address of the augmented reality resource for the target object, where the preset trigger marker is used as an indication for a client to present an augmented reality image of the target object based on the preset trigger marker. In this case, augmented reality resources for preset objects may be generated and stored in advance; and after a user obtains a target object in the preset objects, and an object order is generated, a preset trigger marker corresponding to the object order may be generated based on a storage address of an augmented reality resource for the target object. In other words, the preset trigger marker is associated with the augmented reality resource for each target object. Subsequently, the client may present an augmented reality image of the target object based on the preset trigger marker, so that the augmented reality image can be fused with the target object to create a sense of three-dimensionality for the target object and add a dynamic effect for the target object, enriching presented content of the target object, and making the user more interested in and have a better experience of the obtained object. This can prevent the user from returning the obtained object, saving processing resources.

According to the object presentation method provided by the present application, in response to scanning a preset trigger marker corresponding to an object order, an obtaining request for an augmented reality resource set may be first sent, and a returned target augmented reality resource set may be received, where the target augmented reality resource set is a set including augmented reality resources for all target objects in the object order; and when a first object is scanned, an augmented reality resource for the currently scanned first object may be found directly from the obtained target augmented reality resource set, to synthesize and present an augmented reality image of the scanned first object. In this case, after obtaining the target object, a user may present an augmented reality image of the target object using a client. The augmented reality resource is fused with the target object to create a sense of three-dimensionality of the target object. In other words, a dynamic effect for a target object can be presented after the target object is scanned, enriching presented content of the target object, and making the user more interested in and have a better experience of the obtained object. This can prevent the user from returning the obtained object, saving processing resources.

In addition, there is no need to interact with a server each time a target object is scanned. Instead, an augmented reality resource for the scanned target object can be directly locally obtained. The user only needs to wait to obtain a resource the first time when obtaining the target object, and does not need to wait to obtain a resource during each subsequent scanning of the target object. This reduces the user's waiting time and further improves user experience.

DETAILED DESCRIPTION OF EMBODIMENTS

Figure 1:
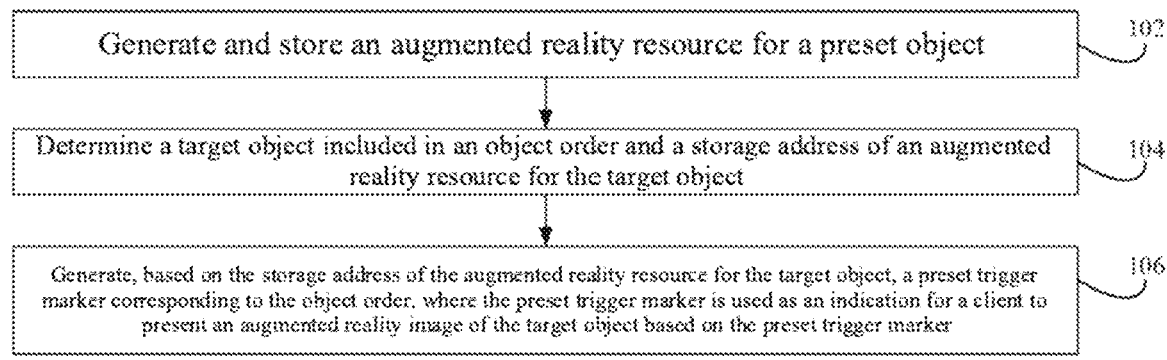
FIG. 1 is a flowchart of a marker generation method according to an embodiment of the present application.

In the following description, numerous specific details are set forth to provide a thorough understanding of the present application. However, the present application can be implemented in numerous other ways different from those described herein, and those skilled in the art can make similar extensions without departing from the essence of the present application. Therefore, the present application is not limited by the specific implementations disclosed below.

Terms used in one or more embodiments of the present application are merely for the purpose of describing specific embodiments, and are not intended to limit one or more embodiments of the present application. The terms "a/an", "said", and "the" in the singular form used in one or more embodiments of the present application and the appended claims are also intended to include the plural form, unless otherwise clearly indicated in the context. It should also be understood that the term "and/or" used in one or more embodiments of the present application refers to and includes any or all possible combinations of one or more of the associated listed items.

It should be understood that although the terms "first", "second", etc. may be used in one or more embodiments of the present application to describe various information, the information should not be limited to these terms. These terms are merely used to distinguish the same type of information from one another. For example, without departing from the scope of one or more embodiments of the present application, "first" may also be referred to as "second", and similarly, "second" may also be referred to as "first". Depending on the context, the word "if" as used herein may be interpreted as "when" or "upon" or "in response to determining".

First, the terms used in one or more embodiments of the present application are explained.

Augmented reality (AR) technology: a new technology that combines real-world information and virtual-word information. AR implements, based on computer technologies, etc., simulation and superimposition of entity information that can hardly be experienced in a real-world space, so that the virtual information is effectively applied in the real world. In addition, this process can be perceived by a human, thereby providing a sensory experience beyond reality.

Trigger marker: a specific image, a specific scene, etc. used to trigger an entry to an augmented reality scenario.

Image recognition: a technology that utilizes a computer to process, analyze, and understand an image, so as to recognize various targets and objects having different patterns.

Model material: Each key point of a three-dimensional model includes a corresponding material.

The present application provides a marker generation method. The present application also relates to a marker generation apparatus, an object presentation method, an object presentation apparatus, a computing device, and a computer-readable storage medium, which are described in detail one by one in the following embodiments.

FIG. 1 is a flowchart of a marker generation method according to an embodiment of the present application. The method specifically includes the following steps.

Step 102: Generate and store an augmented reality resource for a preset object.

Specifically, the preset object may be an object that can be subsequently obtained by a user, and the augmented reality resource may be a resource such as a model and a two-dimensional image required for presenting a three-dimensional image of the preset object. In a possible implementation, the object may be a commodity, and the preset object may be a commodity launched on an e-commerce platform.

For example, a set of cards launched includes a total of 52 cards, and the user may purchase one or more cards in the set of cards. In this case, augmented reality resources for the 52 cards may be first generated and stored.

In actual application, there may be at least one preset object. A server may first determine at least one preset object for which an augmented reality resource needs to be generated, and then generate and store an augmented reality resource corresponding to the at least one preset object, so that subsequently, after obtaining any object, the user can fuse an augmented reality resource and the obtained object to create a sense of three-dimensionality, add a dynamic effect, and enrich presented content.

In an optional implementation of this embodiment, to generate the augmented reality resource for the preset object, the server may generate a three-dimensional model of the preset object and obtain a two-dimensional image required for a key point of the three-dimensional model, that is, generate and store the augmented reality resource for the preset object. A specific implementation process may be as follows:
  generating a three-dimensional model of the preset object, and obtaining a two-dimensional image corresponding to a key point of the three-dimensional model;
  determining the three-dimensional model and the two-dimensional image as the augmented reality resource for the preset object; and
  storing the augmented reality resource for the preset object to a preset storage address.

Specifically, a three-dimensional model is a polyhedral representation of an object, and is usually displayed by using a computer, a mobile device, or another video device. In other words, the three-dimensional model is a three-dimensional representation of the object. It should be noted that for each preset object, a three-dimensional model of the object may be built, and then a two-dimensional image required for a key point of the three-dimensional model may be obtained as an augmented reality resource for the preset object. The key point of the three-dimensional model may be a cutting point of the three-dimensional model in a depth direction.

In addition, the preset storage address may be a preset address for storing the augmented reality resource for the preset object. In actual application, one corresponding preset storage address may be set for each preset object in advance; or one corresponding preset storage address may be set for all preset objects; or the preset objects may be classified, and each class of preset objects corresponds to one preset storage address. In other words, augmented reality resources for the preset objects may be stored in one storage address or in different storage addresses.

It should be noted that for a preset object, a corresponding three-dimensional model and a two-dimensional image required for a key point are an augmented reality resource for the preset object. After the augmented reality resource for the preset object is generated, a corresponding preset storage address of the preset object may be determined, and the augmented reality resource may be stored to the corresponding preset storage address. In other words, a three-dimensional model and a two-dimensional image of a preset object as a whole is an augmented reality resource for the preset object. In addition, an augmented reality resource for each preset object may carry an object identifier of the corresponding preset object, making it convenient to find an augmented reality resource for an object subsequently.

In an optional implementation of this embodiment, because the preset object generally includes a planar image, which is generally an orthographic projection image of a three-dimensional object, the preset object includes image information in a transverse plane, but may not include image information of the three-dimensional object in a depth direction. Therefore, the server may obtain in advance a two-dimensional image of the preset object in the depth direction, that is, obtain a two-dimensional image corresponding to a key point of the three-dimensional model. A specific implementation process may be as follows:
  layering the three-dimensional model in a depth direction, and determining a key point of the three-dimensional model in the depth direction; and
  obtaining a two-dimensional image corresponding to the key point.

It should be noted that the depth direction is a direction perpendicular to the plane. Generally, a planar image is a two-dimensional image, while a three-dimensional image is equivalent to a planar image added with image information in the depth direction perpendicular to the plane, such that the two-dimensional planar image has depth information and is transformed into the three-dimensional image. Therefore, the three-dimensional model may be layered in the depth direction, to obtain a key point of each layer and obtain a two-dimensional image corresponding to the key point. The two-dimensional image is an image required for the three-dimensional model in the depth direction.

Figure 2:
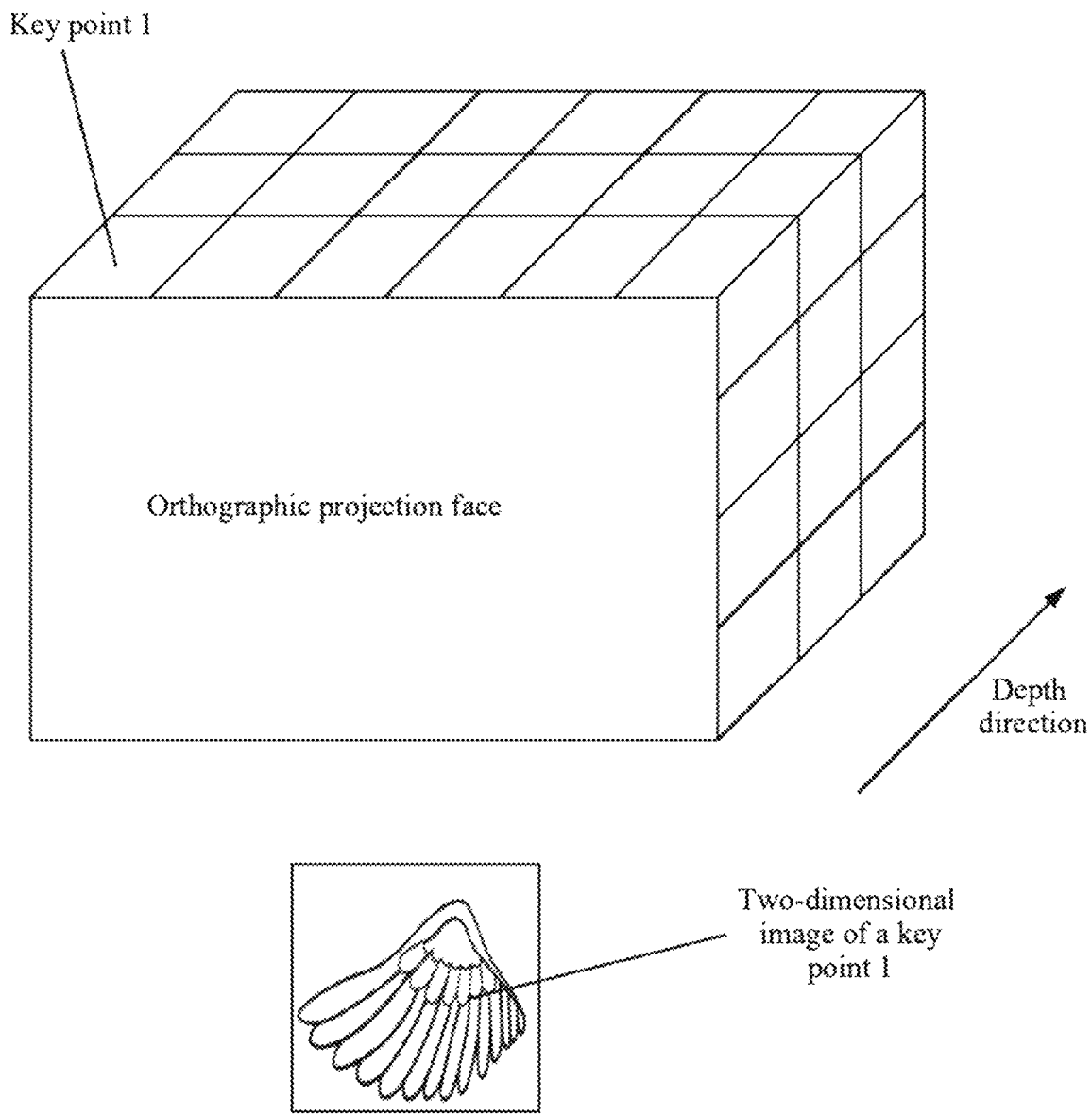
FIG. 2 is a schematic diagram of a three-dimensional model according to an embodiment of the present application.

For example, FIG. 2 is a schematic diagram of a three-dimensional model according to an embodiment of the present application. As shown in FIG. 2, the three-dimensional model is a cube. The cube is layered in the depth direction, and a key point of the cube in the depth direction can be determined. As shown in FIG. 2, each quadrilateral on the cube represents one key point. Then for each key point, a corresponding two-dimensional image may be obtained. As shown in FIG. 2, a two-dimensional image corresponding to a key point 1 is an image of a wing.

In an optional implementation of this embodiment, some preset objects, e.g., a series of commodities, may be associated with and relatively similar to each other. Therefore, a reference template may be first created for the similar preset objects, and then specific characteristic information of a preset object may be added to the reference template, so that a three-dimensional model of the preset object can be generated. In other words, there are at least two preset objects. A specific implementation process of generating the three-dimensional model for the preset object may be as follows:
  determining common information of the at least two preset objects based on presentation images of the at least two preset objects;
  generating, based on the common information, a three-dimensional reference template corresponding to the at least two preset objects; and
  for each of the at least two preset objects, generating a three-dimensional model of the preset object based on the three-dimensional reference template and characteristic information of the preset object.

Specifically, the common information is information shared by the at least two preset objects. The three-dimensional reference template corresponding to the at least two preset objects can be created based on the common information. Next, for each of the at least two preset objects, characteristic information of the preset object, namely, information about the preset object that is different from that about the other preset objects, may be determined based on a presentation image of the preset object. Then, a three-dimensional model of the preset object may be generated based on the pre-created three-dimensional reference template and the characteristic information of the preset object.

It should be noted that the at least two preset objects may share a basic three-dimensional reference template to increase a rate of reusing the same information, and same content in different preset objects does not need to be repeatedly produced. This simplifies a process of generating the three-dimensional model and improves efficiency of generating the three-dimensional model of the preset object.

The augmented reality resource stored in the server in the present application is not an augmented reality image (a three-dimensional image of the object) obtained by synthesizing the three-dimensional model and the two-dimensional image, but the three-dimensional model and the two-dimensional image that are separate from each other, to avoid storing a large number of three-dimensional images and occupying a large storage space. In this way, the storage space of the server can be greatly saved.

Step 104: Determine a target object included in an object order and a storage address of an augmented reality resource for the target object.

Specifically, the object order may be an order generated by the server based on related information of the target object obtained by the user. The target object may be an object specifically obtained by the user. The target object is an object in the preset objects for which the augmented reality resources are generated in advance. There may be at least one target object. In actual application, the object may be a commodity. After the user purchases a target commodity, the server may generate a commodity order based on related information of the target commodity purchased by the user.

In actual application, the target object is an object in the preset objects for which the augmented reality resources are generated and stored in advance, that is, a corresponding augmented reality resource has been stored for each target object in the object order. In addition, the augmented reality resources stored all carry object identifiers of the corresponding preset objects. Therefore, to determine a storage address of an augmented reality resource corresponding to the target object, the object identifiers of the preset objects corresponding to the augmented reality resources may be searched to determine the augmented reality resource corresponding to the object identifier of the target object, so as to determine the corresponding storage address.

In the present application, after the user obtains one or some target objects in the preset objects for which the augmented reality resources are generated in advance, a corresponding object order may be generated. After the object order is generated, each target object included in the object order may be determined, and a storage address of an augmented reality resource corresponding to each target object may be determined, so that the storage address of the augmented reality resource is subsequently included in a preset trigger identifier, to enrich a presentation form of the target object.

Step 106: Generate, based on the storage address of the augmented reality resource for the target object, a preset trigger marker corresponding to the object order, where the preset trigger marker is used as an indication for a client to present an augmented reality image of the target object based on the preset trigger marker.

It should be noted that the preset trigger marker may be a specific marker that can trigger the client to enter an augmented reality scene, and therefore the client needs to be able to obtain a required augmented reality resource based on the preset trigger marker. In other words, the preset trigger marker may be associated with the corresponding augmented reality resource. For example, the preset trigger marker may be a preset two-dimensional code, which may be associated with augmented reality resources for various target objects included in an object order. To be specific, after the client scans the two-dimensional code subsequently, the client is triggered to enter an AR page, and at the same time obtains, from the server, the augmented reality resources for the target objects associated with the two-dimensional code.

In actual application, to generate, based on the storage address of the augmented reality resource for the target object, the preset trigger marker corresponding to the object order, the storage address of the augmented reality resource for each target object may be directly carried in the preset trigger marker. Alternatively, the storage address of the augmented reality resource for the target object may be encoded based on a preset encoding rule, and encoded information is carried in the preset trigger marker. Subsequently, the corresponding storage address may be decoded based on the encoded information sent by the client, and the corresponding augmented reality resource can be obtained and returned to the client.

In an optional implementation of this embodiment, in addition to storage information of the augmented reality resource for each target object, an activation code may also be added to the preset trigger marker, so that the user activates and binds a corresponding target object subsequently using the client. In other words, a specific implementation process of generating, based on the storage address of the augmented reality resource for the target object, the preset trigger marker corresponding to the object order may be as follows:

configuring an activation code for the object order; and
generating, based on the storage address and the activation code, the preset trigger marker corresponding to the object order.

It should be noted that one object order may be configured with one activation code, and subsequently, the client can bind, based on the activation code, the augmented reality resource for each target object included in the object order. In addition, in terms of generating, based on the storage address and the activation code, the preset trigger marker corresponding to the object order, the storage address and the activation code may be carried directly in the preset trigger marker. Alternatively, the server may encode the storage address and the activation code based on the preset encoding rule, and include encoded information in the preset trigger marker.

In actual application, after the preset trigger marker corresponding to the object order is generated, the preset trigger marker may be printed on outer packaging of the target object included in the object order, so that the user subsequently scans the preset trigger marker on the outer packaging of the target object using the client, to obtain the augmented reality resource corresponding to each target object, enriching a presentation form of the target object.

For example, the object is a card sold on an e-commerce platform. Assuming that there are 52 cards for sale, augmented reality resources for the 52 cards may be generated and stored in advance. Assuming that the user has purchased 3 cards, the server generates a purchase order corresponding to the 3 cards, and determines, based on commodity identifiers of the 3 cards, a storage address of augmented reality resources corresponding to the cards. Then, a two-dimensional code is generated based on the storage address, and is printed on outer packaging of the 3 cards, so that the client subsequently scans the two-dimensional code to trigger presentation of AR images of the cards.

In an optional implementation of this embodiment, the server may receive an obtaining request for an augmented reality resource set triggered by the client when scanning the preset trigger marker; and return, based on the obtaining request, a corresponding target augmented reality resource set to the client. In other words, after the generating, based on the storage address of the augmented reality resource for the target object, a preset trigger marker corresponding to the object order, the method further includes:

receiving an obtaining request for an augmented reality resource set;

determining, based on an activation code carried in the obtaining request, whether the obtaining request is verified;

when the obtaining request is verified, obtaining a corresponding augmented reality resource based on a storage address carried in the obtaining request; and combining all obtained augmented reality resources into a target augmented reality resource set, and returning the target augmented reality resource set to a requester that initiates the obtaining request.

Specifically, the augmented reality resource set is a collection of augmented reality resources for all target objects included in one object order. After the user obtains the target object, the user may scan the preset trigger marker on the outer packaging of the target object using the client, to trigger sending the obtaining request for the augmented reality resource set to the server. The obtaining request for the augmented reality resource set is used to obtain the augmented reality resources for all the target objects included in the object order. In addition, the requester that initiates the obtaining request may be the client used by the user to scan the preset trigger marker. After scanning the preset trigger marker, the client sends, to the server, the requester that initiates the obtaining request.

It should be noted that when receiving the obtaining request for the augmented reality resource set, the server may perform verification the sent obtaining request based on the activation code carried in the obtaining request. If the obtaining request is verified, the server obtains corresponding augmented reality resources based on storage addresses carried in the obtaining request; combines the obtained augmented reality resources into the target augmented reality resource set; and returns the target augmented reality resource set to the client that initiates the obtaining request. If the obtaining request fails to be verified, the target augmented reality resource set is not returned to the client.

In the present application, the activation code may be carried in the generated preset trigger marker, and after the user subsequently scans the preset trigger marker using the client, the activation code may be carried in the obtaining request for the augmented reality resource set sent to the server, so that the server can determine whether the currently initiated obtaining request for the augmented reality resource set is valid, which improves security of the augmented reality resource set.

In an optional implementation of this embodiment, the verification may be performed on the obtaining request by determining whether a user account that initiates the obtaining request is a user account previously activated. In other words, a specific implementation process of determining, based on the activation code carried in the obtaining request, whether the obtaining request is verified is as follows:

querying a preset database for the activation code to determine whether there is a target user account corresponding to the activation code; and when there is no target user account corresponding to the activation code, determining that the obtaining request is verified, and storing, as a correspondence, the activation code and a user account that initiates the obtaining request; or when there is a target user account corresponding to the activation code, determining whether the user account that initiates the obtaining request is the same as the target user account, and if the user account is the same as the target user account, determining that the obtaining request is verified.

Specifically, the preset database may be a database that stores a correspondence between the activation code and the user account. It should be noted that the user may log in to the client when using the client to scan the preset trigger marker to trigger presentation of the augmented reality image of the target object. When the client scans the preset trigger marker and sends the obtaining request for the augmented reality resource set to the server, the client may further include the logged-in user account in the obtaining request, to activate and register the target augmented reality resource set corresponding to the preset trigger marker, and verify validity of the user account.

In actual application, after receiving the obtaining request for the augmented reality resource set sent by the client, the server may parse the obtaining request for the augmented reality resource set to obtain the activation code carried in the obtaining request, and then query the preset database for the activation code. If there is no target user account corresponding to the activation code in the preset database, it indicates that the user account that initiates the obtaining request is an account that is activated and registered for the first time. In this case, it can be determined that the user account that initiates the obtaining request is valid, that is, the request is verified, and the activation code and the user account that initiates the obtaining request are stored as a correspondence in the preset database for subsequent query.

In addition, if a corresponding target user account corresponding to the activation code is found in the preset database, it indicates that the target user account has already been activated and registered by a user before. In this case, it may be further determined whether the user account that initiates the obtaining request is the same as the target user account found in the preset database. If the two user accounts are the same, it indicates that the same user initiates the obtaining request for the augmented reality resource set again, and the obtaining request is valid. In other words, it is determined that the obtaining request is verified. If the two user accounts are not the same, that is, the user who currently initiates the obtaining request for the augmented reality resource set is different from the user who previously performs activation and registration, it indicates that the currently initiated obtaining request is invalid. In other words, it is determined that the obtaining request fails to be verified. In this case, the target augmented reality resource set is not returned to the client.

It should be noted that, when receiving the obtaining request for the augmented reality resource set sent by the client, the server may determine, based on the activation code carried in the obtaining request, whether the user who initiates the obtaining request is valid. Only the user who performs activation and registration for the first time is valid, and the user can obtain the augmented reality resource collection for the target objects included in the object order after the activation and registration for the first time and during the subsequent time. This prevents the augmented reality resource collection for the target objects included in the object order from being obtained by another user, which improves security of the augmented reality resource set.

According to the marker generation method of the present application, augmented reality resources for preset objects may be generated and stored in advance; and after a user obtains a target object in the preset objects, and an object order is generated, a preset trigger marker corresponding to the object order may be generated based on a storage address of an augmented reality resource for the target object, and the preset trigger marker may be printed on outer packaging of the target object. In other words, the preset trigger marker is associated with the augmented reality resource for each target object. Subsequently, the client may present an augmented reality image of the target object based on the preset trigger marker, so that the augmented reality image can be fused with the target object to create a sense of three-dimensionality for the target object and add a dynamic effect for the target object, enriching presented content of the target object, and making the user more interested in and have a better experience of the obtained object. This can prevent the user from returning the obtained object, saving processing resources.

Figure 3:
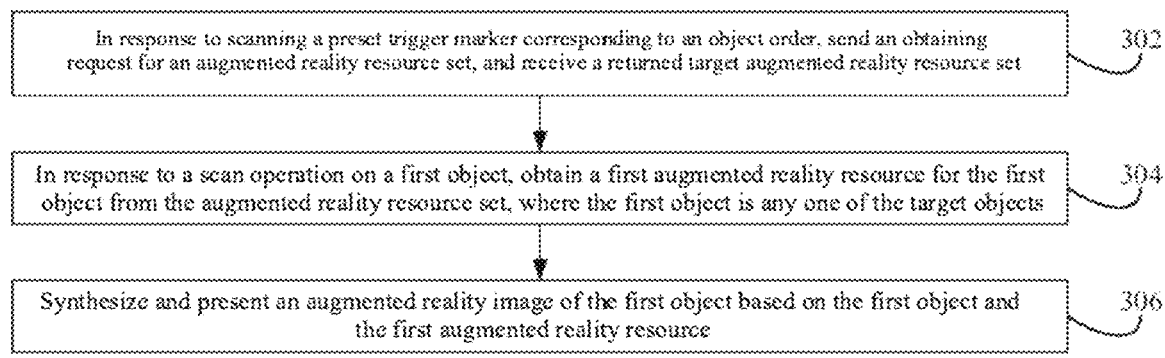
FIG. 3 is a flowchart of an object presentation method according to an embodiment of the present application.

FIG. 3 is a flowchart of an object presentation method according to an embodiment of the present application. The method specifically includes the following steps.

Step 302: In response to scanning a preset trigger marker corresponding to an object order, send an obtaining request for an augmented reality resource set, and receive a returned target augmented reality resource set.

Specifically, the preset trigger marker may be generated based on the foregoing marker generation method shown in FIG. 1, and the target augmented reality resource set is a set including augmented reality resources for all target objects in the object order. In addition, the object order may be an order generated by a server based on related information of the target object obtained by a user. The target object may be an object specifically obtained by the user, and the target object is an object for which an augmented reality resource is generated and stored in advance.

It should be noted that the preset trigger marker is a specific preset marker that can trigger an entry to an augmented reality scene, and the preset trigger marker is associated with a corresponding augmented reality resource set. For example, the preset trigger marker may be a preset two-dimensional code, which is associated with the augmented reality resource set. To be specific, after the user scans the two-dimensional code using a client, the client may be triggered to enter an AR page, and at the same time obtain, from the server, the augmented reality resource set associated with the two-dimensional code. The augmented reality resource set may be a collection of augmented reality resources for all target objects included in the object order corresponding to the preset trigger marker.

For example, the object is a card sold on an e-commerce platform. Assuming that the user has purchased 3 cards, after receiving the purchased cards, the user uses the client to scan a two-dimensional code printed on outer packaging of the cards. In this case, the object order is a purchase order for the 3 cards, and the client may send an obtaining request for an augmented reality resource set to the server to obtain, from the server, an augmented reality resource set corresponding to the purchase order. The augmented reality resource set includes augmented reality resources for the 3 cards in the purchase order.

It should be noted that, when the client scans the preset trigger marker, it indicates that the user scans the preset trigger marker printed on outer packaging of the target object using the client, and that the user wants to enter an augmented reality scene to view a dynamic three-dimensional effect of the target object included in the object order. Therefore, a request for obtaining the augmented reality resource set may be directly sent to the server, and the augmented reality resource set corresponding to the preset trigger marker returned by the server may be received. In other words, when the user scans the preset trigger marker using the client, the user can directly obtain all augmented reality resources associated with the preset trigger marker.

In actual application, the preset trigger marker may be associated with the augmented reality resources for all the target objects included in the object order, and scanning the preset trigger marker can trigger obtaining of the collection (namely, the target augmented reality resource set) of augmented reality resources corresponding to all the target objects included in the object order. Therefore, after the client scans the preset trigger marker, the server needs to obtain the target augmented reality resource set at a corresponding storage location based on the scanned preset trigger marker. Therefore, the preset trigger marker may further carry a corresponding storage address. In addition, to ensure security of the augmented reality resource, when generating the preset trigger marker, the server may further carry an activation code in the preset trigger marker. In this case, after the client scans the preset trigger marker, the obtaining request for the augmented reality resource set sent to the server may further carry the activation code, so that the server determines, based on the activation code, whether to return the target augmented reality resource set to the client.

In an optional implementation of this embodiment, the preset trigger marker carries an activation code and a storage address of an augmented reality resource for the target object; and in response to the scan operation on the preset trigger marker corresponding to the object order, a specific implementation process of sending an obtaining request for an augmented reality resource set, and receiving a returned target augmented reality resource set may alternatively be as follows:

in response to the scan operation on the preset trigger marker corresponding to the object order, obtaining an activation code and a storage address in the preset trigger marker;

sending the obtaining request for the augmented reality resource set, where the obtaining request carries the activation code and the storage address; and receiving the target augmented reality resource set returned based on the storage address if the obtaining request is verified.

It should be noted that the preset trigger marker may carry the activation code and the storage address, and after scanning the preset trigger marker, the client may send the obtaining request for obtaining the augmented reality resource set to the server. The obtaining request carries the activation code and the storage address, so that after receiving the obtaining request for obtaining the augmented reality resource set, the server may verify, based on the activation code carried in the obtaining request, whether the user who initiates the obtaining request is authorized, that is, determine whether the obtaining request is verified. When determining that the obtaining request is verified, the server may obtain corresponding augmented reality resources based on the storage address and combine the augmented reality resources into a target augmented reality resource set, and return the target augmented reality resource set to the client.

For example, the object order includes 10 target objects, and when the user uses the client to scan a preset trigger marker corresponding to the object order, the client may send an obtaining request to the server, to obtain, from the server, a collection of all augmented reality resources for the 10 target objects included in the object order. In other words, the obtained target augmented reality resource set includes the augmented reality resources for the 10 target objects.

In the present application, the augmented reality resources for the objects included in the object order can be directly obtained when the preset trigger marker is scanned. There is no need to interact with the server subsequently each time a target object is scanned. Instead, an augmented reality resource for the scanned target object can be directly locally obtained. The user only needs to wait to obtain the target augmented reality resource set at the first time, and does not need to wait to obtain a resource during each subsequent scanning of the target object. This reduces the user's waiting time and further improves user experience.

In addition, the target augmented reality resource set stored in the server in the present application is not an augmented reality image (a three-dimensional image of the object) obtained by synthesizing the three-dimensional model and the two-dimensional image, but the three-dimensional model and the two-dimensional image that are separate from each other, to avoid storing a large number of three-dimensional images and occupying a large storage space. In this way, the storage space of the server can be greatly saved. Correspondingly, when the client scans the preset trigger marker, the client may obtain the target augmented reality resource set from the server. Because the target augmented reality resource set is smaller than a synthesized three-dimensional image, the client does not need to store a large number of three-dimensional images, which saves storage space of the client, and can save download resources used for the client to obtain the augmented reality resource set, thereby reducing a download time and the user's waiting time.

Step 304: In response to a scan operation on a first object, obtain a first augmented reality resource for the first object from the augmented reality resource set, where the first object is any one of the target objects.

The first object is any of the objects included in the object order currently scanned by the client. The augmented reality resource set is a collection, obtained from the server, of the augmented reality resources for the target objects included in the object order. In other words, the target augmented reality resource set includes the augmented reality resources for the target objects in the object order.

It should be noted that after scanning the preset trigger marker using the client, the user may trigger the client to enter an augmented reality scene, that is, enter an AR interface. In this case, the user may scan any one of the target objects included in the object order in the AR interface, to obtain the augmented reality resource for the scanned target object.

In an optional implementation of this embodiment, each augmented reality resource included in the augmented reality resource set carries a corresponding object identifier; and a specific implementation process of obtaining a first augmented reality resource for the first object from the augmented reality resource set may be as follows:

performing image recognition on the first object to determine a presentation image of the first object image;

determining, based on the presentation image, an object identifier of the first object; and obtaining the first augmented reality resource for the first object from the augmented reality resource set based on the object identifier.

It should be noted that when the preset trigger marker is scanned, the collection (namely, the target augmented reality resource set) of augmented reality resources for the target objects included in the object order has been obtained from the server. The target augmented reality resource set includes the augmented reality resources for the target objects in the object order. Therefore, after the first object is scanned, the first object is recognized, and the presentation image of the first object can be obtained. The object identifier of the first object can be determined based on the presentation image. Then the first augmented reality resource corresponding to the first object can be directly obtained from the target augmented reality resource set based on the object identifier, without further interaction with the server. The user only needs to wait to obtain the target augmented reality resource set at the first time, and does not need to wait to obtain a resource during each subsequent scanning of the target object. This reduces the user's waiting time and further improves user experience.

In the present application, when the client scans the preset trigger marker, the client can obtain the target augmented reality resources corresponding to the target objects included in the object order from the server, and the user only needs to wait for this resource download. In other words, after the user scans the preset trigger marker using the client, during the time when the client obtains the target augmented reality resource set from the server (during the process of resource download), the user can view all the target objects. Subsequently, after selecting the target object, the user can directly scan the target object using the client. In this case, the augmented reality resources for all the target objects included in the object order have been downloaded, so that the corresponding augmented reality resource can be directly locally obtained. The user does not need to wait for the resource to be downloaded after selecting a specific target object, reducing the user's waiting time and providing the user with a senseless and smooth experience.

Step 306: Synthesize and present an augmented reality image of the first object based on the first object and the first augmented reality resource.

It should be noted that after the first object is scanned, the corresponding first augmented reality resource can be obtained locally from the target augmented reality resource set, and then the augmented reality image of the first object can be presented based on the first object and the obtained first augmented reality resource. In this way, the augmented reality resource can be fused with the real target object to create a sense of three-dimensionality of the target object. In other words, a dynamic effect for a target object can be presented after the target object is scanned, enriching presented content of the target object, improving user experience, and making the user more interested in and have a better experience of the obtained object. This can prevent the user from returning the obtained object, saving processing resources.

In an optional implementation of this embodiment, the first augmented reality resource includes a three-dimensional model of the first object, and a two-dimensional image corresponding to a key point of the three-dimensional model; and the synthesizing and presenting an augmented reality image of the first object based on the first object and the first augmented reality resource includes:
  determining a presentation image of the first object;
  rendering the three-dimensional model of the first object based on the presentation image and the two-dimensional image corresponding to the key point of the three-dimensional model, to obtain the augmented reality image of the first object; and
  presenting the augmented reality image of the first object at a presentation location associated with the first object.

It should be noted that the corresponding first augmented reality resource may be obtained based on the object identifier of the first object, and the first augmented reality resource includes the three-dimensional model of the first object and the two-dimensional image required in a depth direction. After the augmented reality resource for the first object is obtained, the three-dimensional model may be rendered based on the presentation image of the first object and the two-dimensional image required in the depth direction, to obtain the augmented reality image of the first object.

In addition, the presentation location associated with the first object may be a location of the presentation image in the first object. In other words, a three-dimensional effect image of the object is presented at a location of the presented two-dimensional object.

In an optional implementation of this embodiment, a specific implementation process of rendering the three-dimensional model of the first object based on the presentation image and the two-dimensional image corresponding to the key point of the three-dimensional model, to obtain the augmented reality image of the first object may be as follows:
  determining an orthographic projection face of the three-dimensional model;
  rendering the presentation image of the first object on the orthographic projection face; and
  rendering, at the key point, the two-dimensional image corresponding to the key point of the three-dimensional model, to obtain the augmented reality image of the first object.

Still in the above example, as shown in FIG. 2, the orthographic projection face of the three-dimensional model is the front face of the cube.

It should be noted that the presentation image of the first object is an orthographic projection image of the three-dimensional first object. In other words, the orthographic projection face in the three-dimensional model is the presentation image of the first object. Therefore, the presentation image of the first object can be directly rendered on the orthographic projection face of the three-dimensional model, and then the two-dimensional image required in the depth direction is rendered at the key point corresponding to the depth direction of the three-dimensional model, to obtain the rendered three-dimensional model, which is the augmented reality image of the first object.

The obtained augmented reality resource in the present application is not a synthesized augmented reality image (a three-dimensional image), but the three-dimensional model and the required two-dimensional image that are separate from each other. When the user scans a specific target object using the client, a model material (a two-dimensional image) in the three-dimensional model in the augmented reality resource is dynamically replaced based on the obtained augmented reality resource. In other words, after the client scans a target object, the three-dimensional model in the augmented reality resource is rendered based on the presentation image obtained by recognizing the target object and the two-dimensional image in the augmented reality resource, to obtain an augmented reality image of the target object.

In an optional implementation of this embodiment, after the synthesizing and presenting an augmented reality image of the first object based on the first object and the first augmented reality resource, the method further includes:
  in response to scanning a second object, obtaining a second augmented reality resource for the second object from the augmented reality resource set, where the second object is any one of the target objects which is different from the first object; and
  synthesizing and presenting an augmented reality image of the second object based on the second object and the second augmented reality resource.

It should be noted that, after the user scans the first object, and the augmented reality image of the first object is synthesized and presented based on the first object and the first augmented reality resource, the user may continue to scan another target object (namely, the second object) included in the object order using the client, so as to synthesize and present an augmented reality image of the another target object. After scanning the preset trigger marker using the client, the user can obtain the augmented reality resources for all the target objects included in the object order from the server. Therefore, when scanning another target object using the client, the user does not need to interact with the server again, but can directly obtain the augmented reality resource for the newly scanned second object from the local augmented reality resource set. This reduces the user's waiting time and further improves user experience.

According to the object presentation method provided by the present application, after obtaining the target object, a user may present an augmented reality image of the target object using a client. The augmented reality resource is fused with the target object to create a sense of three-dimensionality of the target object. In other words, a dynamic effect for a target object can be presented after the target object is scanned, enriching presented content of the target object, and making the user more interested in and have a better experience of the obtained object. This can prevent the user from returning the obtained object, saving processing resources. In addition, there is no need to interact with a server each time a target object is scanned. Instead, an augmented reality resource for the scanned target object can be directly locally obtained. The user only needs to wait to obtain a resource the first time when obtaining the target object, and does not need to wait to obtain a resource during each subsequent scanning of the target object. This reduces the user's waiting time and further improves user experience.

Figure 4:
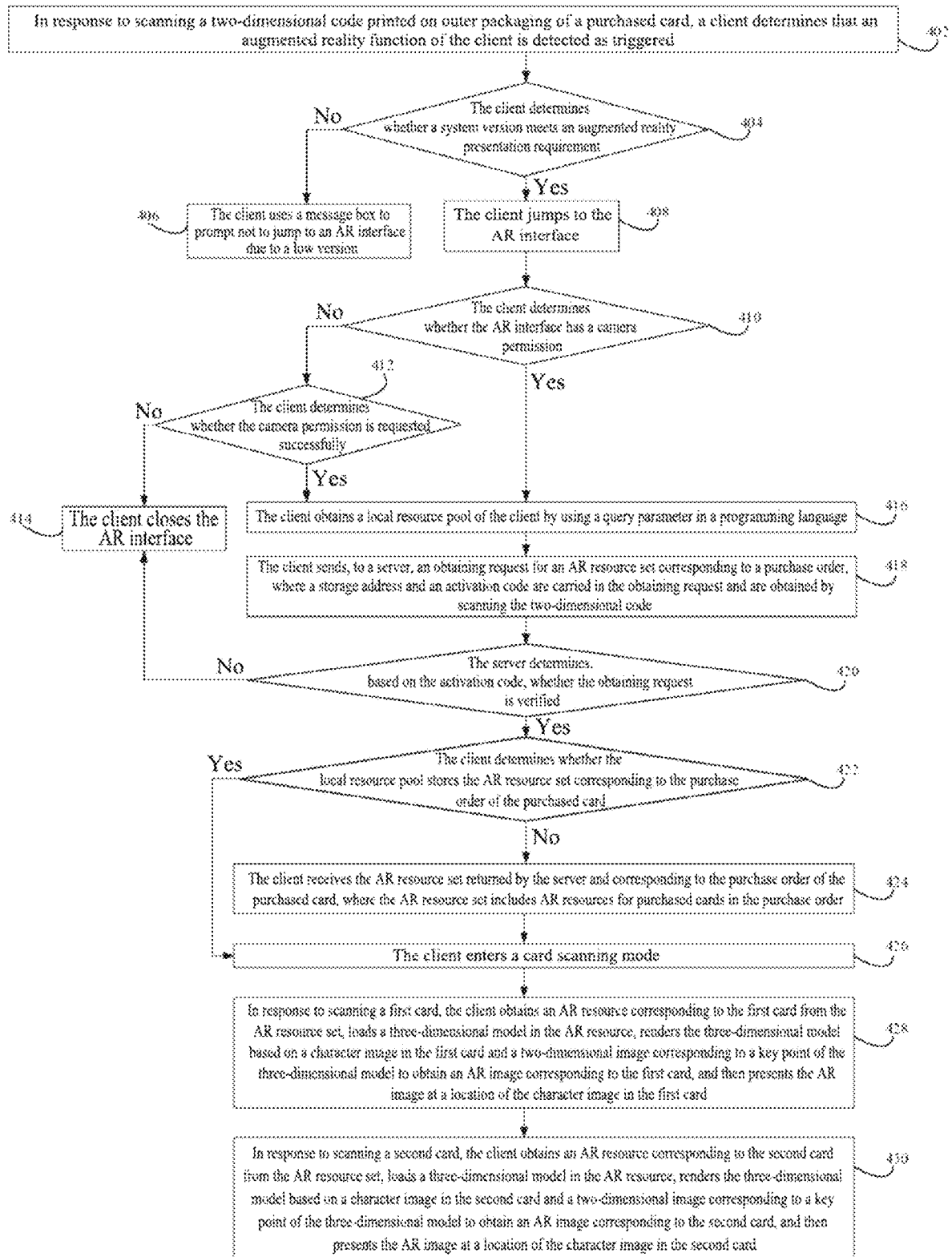
FIG. 4 is a processing flowchart of an object presentation method applied to an e-commerce scenario according to an embodiment of the present application.

The object presentation method is further described below with reference to FIG. 4 by using an example in which the object presentation method provided by the present application is applied in an e-commerce scenario. FIG. 4 is a processing flowchart of an object presentation method applied to an e-commerce scenario according to an embodiment of the present application. The method specifically includes the following steps.

Step 402: In response to scanning a two-dimensional code printed on outer packaging of a purchased card, a client determines that an augmented reality function of the client is detected as triggered.

Step 404: The client determines whether a system version meets an augmented reality presentation requirement. If the augmented reality presentation requirement is not met, step 406 is performed; and if the augmented reality presentation requirement is met, step 408 is performed.

It should be noted that when a user wants to view a three-dimensional dynamic effect of the purchased card, the user may use their own client to open a preset application, click an AR control in the preset application, and scan the two-dimensional code printed on the outer packaging of the purchased card, to trigger the augmented reality function. Because presentation of an augmented reality special effect has a specific requirement on a system version of a terminal, when it is detected that an augmented reality function of the client is triggered, whether the system version of the client meets the augmented reality presentation requirement is further determined. If the presentation requirement is not met, it indicates that the system version is too low to support the presentation of the augmented reality effect, and the client does not jump to an AR interface. If the presentation requirement is met, it indicates that the system version meets the requirement and can support presentation of the augmented reality special effect, and the client jumps to the AR interface.

Step 406: The client uses a message box to prompt not to jump to the AR interface due to a low version.

Step 408: The client jumps to the AR interface.

Step 410: The client determines whether the AR interface has a camera permission. If the AR interface does not have the camera permission, step 412 is performed; and if the AR interface has the camera permission, step 416 is performed.

It should be noted that after the client jumps to the AR interface, a specific card face needs to be scanned using a camera of the client. Therefore, it is required to determine in advance whether the client has the camera permission in the AR interface. If the client does not have the camera permission, it indicates that the card face cannot be scanned subsequently using the camera in the AR interface. In this case, the camera permission may be requested. If the camera permission is requested successfully, it indicates that the card face can be scanned subsequently, and a corresponding AR resource can be obtained. If the camera permission fails to be requested, it indicates that the card face cannot be scanned subsequently, and that the augmented reality special effect cannot be presented subsequently. Therefore, in this case, the AR interface can be closed, and a corresponding AR resource does not need to be obtained.

Step 412: The client determines whether the camera permission is requested successfully. If the camera permission is requested successfully, step 416 is performed; and if the camera permission fails to be requested, step 414 is requested.

Step 414: The client closes the AR interface.

Step 416: The client obtains a local resource pool of the client by using a query parameter in a programming language.

Step 418: The client sends, to a server, an obtaining request for an AR resource set corresponding to a purchase order, where a storage address and an activation code are carried in the obtaining request and are obtained by scanning the two-dimensional code.

Step 420: The server determines, based on the activation code, whether the obtaining request is verified. If the obtaining request is verified, step 422 is performed; and if the obtaining request fails to be verified, the method returns to step 414.

Step 422: The client determines whether the local resource pool stores the AR resource set corresponding to the purchase order of the purchased card. If the AR resource set is not stored, step 424 is performed; and if the AR resource set is stored, step 426 is performed.

It should be noted that after the user scans the two-dimensional code printed on the outer packaging of the purchased card using the client, the user may first determine whether the AR resource set corresponding to the purchase order has been stored locally. If the AR resource set has been stored, it indicates that the client has previously scanned the two-dimensional code printed on the outer packaging of the purchased card and has already obtained the corresponding AR resource set from the server, and there is no need to obtain the AR resource set again. The client may directly enter a card face scanning mode, so that the user scans the face of a card for which the user wants to view a three-dimensional effect. If the AR resource set has not been stored, it indicates that the client has not scanned the two-dimensional code printed on the outer packaging of the purchased card before. In this case, the corresponding AR resource set needs to be obtained from the server first, and then the client enters the card face scanning mode, so that the user scans the face of a card for which the user wants to view a three-dimensional effect.

Step 424: The client receives the AR resource set returned by the server and corresponding to the purchase order of the purchased card, where the AR resource set includes AR resources for the purchased cards in the purchase order.

Step 426: The client enters the card scanning mode.

Step 428: In response to scanning a first card, the client obtains an AR resource corresponding to the first card from the AR resource set, loads a three-dimensional model in the AR resource, renders the three-dimensional model based on a character image in the first card and a two-dimensional image corresponding to a key point of the three-dimensional model to obtain an AR image corresponding to the first card, and then presents the AR image at a location of the character image in the first card.

Step 430: In response to scanning a second card, the client obtains an AR resource corresponding to the second card from the AR resource set, loads a three-dimensional model in the AR resource, renders the three-dimensional model based on a character image in the second card and a two-dimensional image corresponding to a key point of the three-dimensional model to obtain an AR image corresponding to the second card, and then presents the AR image at a location of the character image in the second card.

According to the object presentation method provided by the present application, after purchasing the card, a user may present an augmented reality image of the card using a client. The augmented reality resource is fused with the card to create a sense of three-dimensionality of the card. In other words, a dynamic effect for a card can be presented after the card is scanned, enriching presented content of the card, and making the user more interested in and have a better experience of the purchased card. This can prevent the user from returning the purchased card, saving processing resources. In addition, there is no need to interact with a server each time a card is scanned. Instead, an augmented reality resource for the scanned card can be directly locally obtained. The user only needs to wait to obtain a resource the first time, and does not need to wait to obtain a resource during each subsequent scanning of the card. This reduces the user's waiting time and further improves user experience.

Figure 5:
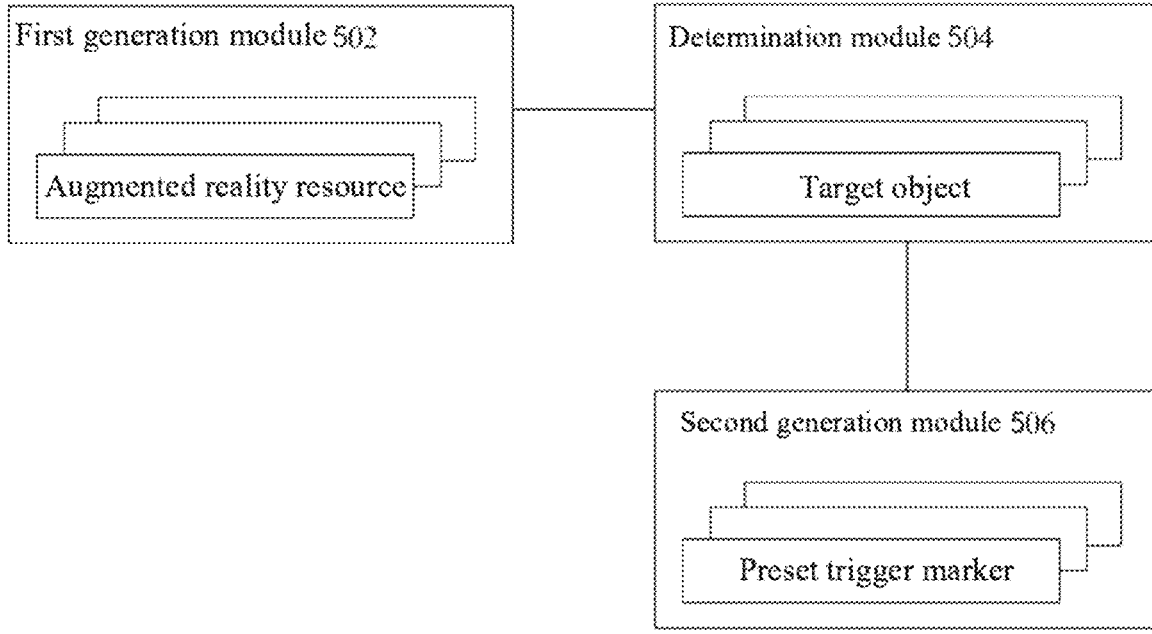
FIG. 5 is a schematic structural diagram of a marker generation apparatus according to an embodiment of the present application.

The present application further provides an embodiment of a marker generation apparatus corresponding to the foregoing method embodiment. FIG. 5 is a schematic structural diagram of a marker generation apparatus according to an embodiment of the present application. As shown in FIG. 5, the apparatus includes:

a first generation module 502 configured to generate and store an augmented reality resource for a preset object;

a determination module 504 configured to determine a target object included in an object order and a storage address of an augmented reality resource for the target object; and a second generation module 506 configured to generate, based on the storage address of the augmented reality resource for the target object, a preset trigger marker corresponding to the object order, where the preset trigger marker is used as an indication for a client to present an augmented reality image of the target object based on the preset trigger marker.

Optionally, the first generation module 502 is further configured to:

generate a three-dimensional model of the preset object, and obtain a two-dimensional image corresponding to a key point of the three-dimensional model;

determine the three-dimensional model and the two-dimensional image as the augmented reality resource for the preset object; and store the augmented reality resource for the preset object to a preset storage address.

Optionally, the first generation module 502 is further configured to:

layer the three-dimensional model in a depth direction, and determine a key point of the three-dimensional model in the depth direction; and obtain a two-dimensional image corresponding to the key point.

Optionally, there are at least two preset objects; and the first generation module 502 is further configured to:

determine common information of the at least two preset objects based on presentation images of the at least two preset objects;

generate, based on the common information, a three-dimensional reference template corresponding to the at least two preset objects; and for each of the at least two preset objects, generate a three-dimensional model of the preset object based on the three-dimensional reference template and characteristic information of the preset object.

Optionally, the second generation module 506 is further configured to:

configure an activation code for the object order; and generate, based on the storage address and the activation code, the preset trigger marker corresponding to the object order.

Optionally, the apparatus further includes a returning module configured to:

receive an obtaining request for an augmented reality resource set;

determine, based on an activation code carried in the obtaining request, whether the obtaining request is verified;

when the obtaining request is verified, obtain a corresponding augmented reality resource based on a storage address carried in the obtaining request; and combine all obtained augmented reality resources into a target augmented reality resource set, and return the target augmented reality resource set to a requester that initiates the obtaining request.

Optionally, the returning module is further configured to:

query a preset database for the activation code to determine whether there is a target user account corresponding to the activation code; and when there is no target user account corresponding to the activation code, determine that the obtaining request is verified, and store, as a correspondence, the activation code and a user account that initiates the obtaining request; or when there is a target user account corresponding to the activation code, determine whether the user account that initiates the obtaining request is the same as the target user account, and if the user account is the same as the target user account, determine that the obtaining request is verified.

According to the marker generation apparatus provided by the present application, augmented reality resources for preset objects may be generated and stored in advance; and after a user obtains a target object in the preset objects, and an object order is generated, a preset trigger marker corresponding to the object order may be generated based on a storage address of an augmented reality resource for the target object. In other words, the preset trigger marker is associated with the augmented reality resource for each target object. Subsequently, the client may present an augmented reality image of the target object based on the preset trigger marker, so that the augmented reality image can be fused with the target object to create a sense of three-dimensionality for the target object and add a dynamic effect for the target object, enriching presented content of the target object, and making the user more interested in and have a better experience of the obtained object. This can prevent the user from returning the obtained object, saving processing resources.

The foregoing description is a schematic solution of the marker generation apparatus of this embodiment. It should be noted that the technical solution of the marker generation apparatus belongs to the same concept as the technical solution of the foregoing marker generation method. For details that are not further described in the technical solution of the marker generation apparatus, refer to the descriptions of the technical solution of the foregoing marker generation method.

Figure 6:
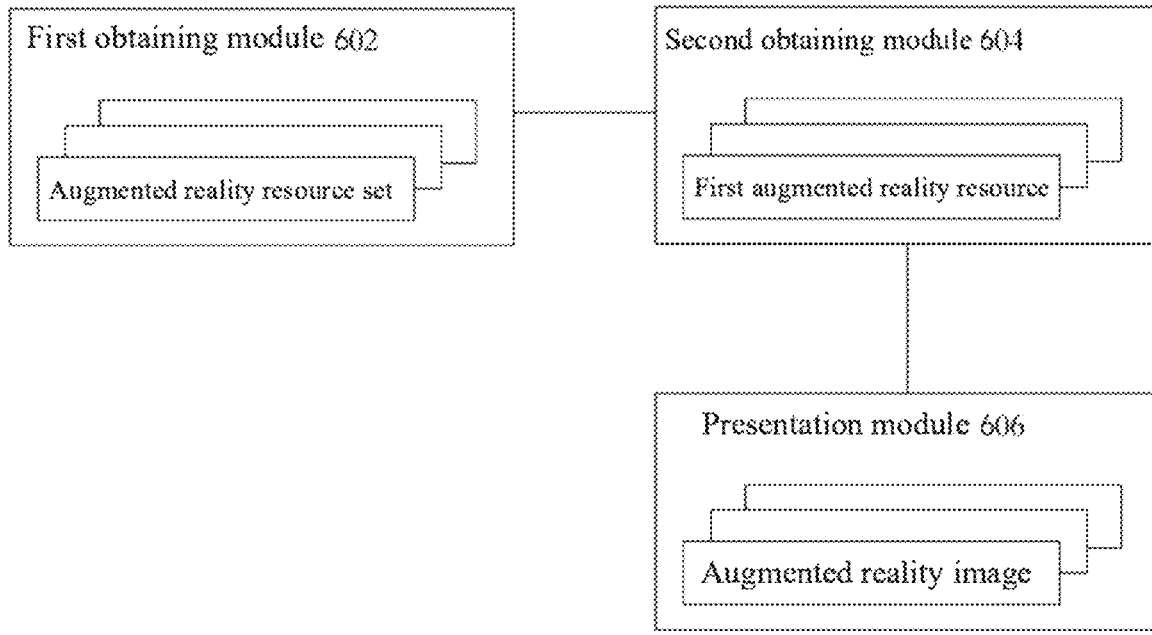
FIG. 6 is a schematic structural diagram of an object presentation apparatus according to an embodiment of the present application.

The present application further provides an embodiment of an object presentation apparatus corresponding to the foregoing method embodiment. FIG. 6 is a schematic structural diagram of an object presentation apparatus according to an embodiment of the present application. As shown in FIG. 6, the apparatus includes:

a first obtaining module 602 configured to: in response to scanning a preset trigger marker corresponding to an object order, send an obtaining request for an augmented reality resource set, and receive a returned target augmented reality resource set, where the target augmented reality resource set is a set including augmented reality resources for all target objects in the object order;

a second obtaining module 604 configured to: in response to a scan operation on a first object, obtain a first augmented reality resource for the first object from the augmented reality resource set, where the first object is any one of the target objects; and a presentation module 606 configured to synthesize and present an augmented reality image of the first object based on the first object and the first augmented reality resource.

Optionally, the preset trigger marker carries an activation code and a storage address of an augmented reality resource for the target object; and the first obtaining module 602 is further configured to:
 in response to the scan operation on the preset trigger marker corresponding to the object order, obtain an activation code and a storage address in the preset trigger marker;
 send the obtaining request for the augmented reality resource set, where the obtaining request carries the activation code and the storage address; and
 receive the target augmented reality resource set returned based on the storage address if the obtaining request is verified.

Optionally, the apparatus further includes a third obtaining module configured to:
 in response to scanning a second object, obtain a second augmented reality resource for the second object from the augmented reality resource set, where the second object is any one of the target objects which is different from the first object; and
 synthesize and present an augmented reality image of the second object based on the second object and the second augmented reality resource.

Optionally, the first augmented reality resource includes a three-dimensional model of the first object, and a two-dimensional image corresponding to a key point of the three-dimensional model; and the presentation module 606 is further configured to:
 determine a presentation image of the first object;
 render the three-dimensional model of the first object based on the presentation image and the two-dimensional image corresponding to the key point of the three-dimensional model, to obtain the augmented reality image of the first object; and
 present the augmented reality image of the first object at a presentation location associated with the first object.

Optionally, the presentation module 606 is further configured to:
 determine an orthographic projection face of the three-dimensional model;
 render the presentation image of the first object on the orthographic projection face; and
 render, at the key point, the two-dimensional image corresponding to the key point of the three-dimensional model, to obtain the augmented reality image of the first object.

Optionally, each augmented reality resource included in the augmented reality resource set carries a corresponding object identifier; and the second obtaining module 604 is further configured to:
 perform image recognition on the first object to determine a presentation image of the first object image;
 determine, based on the presentation image, an object identifier of the first object; and
 obtain the first augmented reality resource for the first object from the augmented reality resource set based on the object identifier.

According to the object presentation method provided by the present application, after obtaining the target object, a user may present an augmented reality image of the target object using a client. The augmented reality resource is fused with the target object to create a sense of three-dimensionality of the target object. In other words, a dynamic effect for a target object can be presented after the target object is scanned, enriching presented content of the target object, and making the user more interested in and have a better experience of the obtained object. This can prevent the user from returning the obtained object, saving processing resources. In addition, there is no need to interact with a server each time a target object is scanned. Instead, an augmented reality resource for the scanned target object can be directly locally obtained. The user only needs to wait to obtain a resource the first time when obtaining the target object, and does not need to wait to obtain a resource during each subsequent scanning of the target object. This reduces the user's waiting time and further improves user experience.

The foregoing description is a schematic solution of the object presentation apparatus of this embodiment. It should be noted that the technical solution of the object presentation apparatus belongs to the same concept as the technical solution of the foregoing object presentation method. For details that are not further described in the technical solution of the object presentation apparatus, refer to the descriptions of the technical solution of the foregoing object presentation method.

Figure 7:
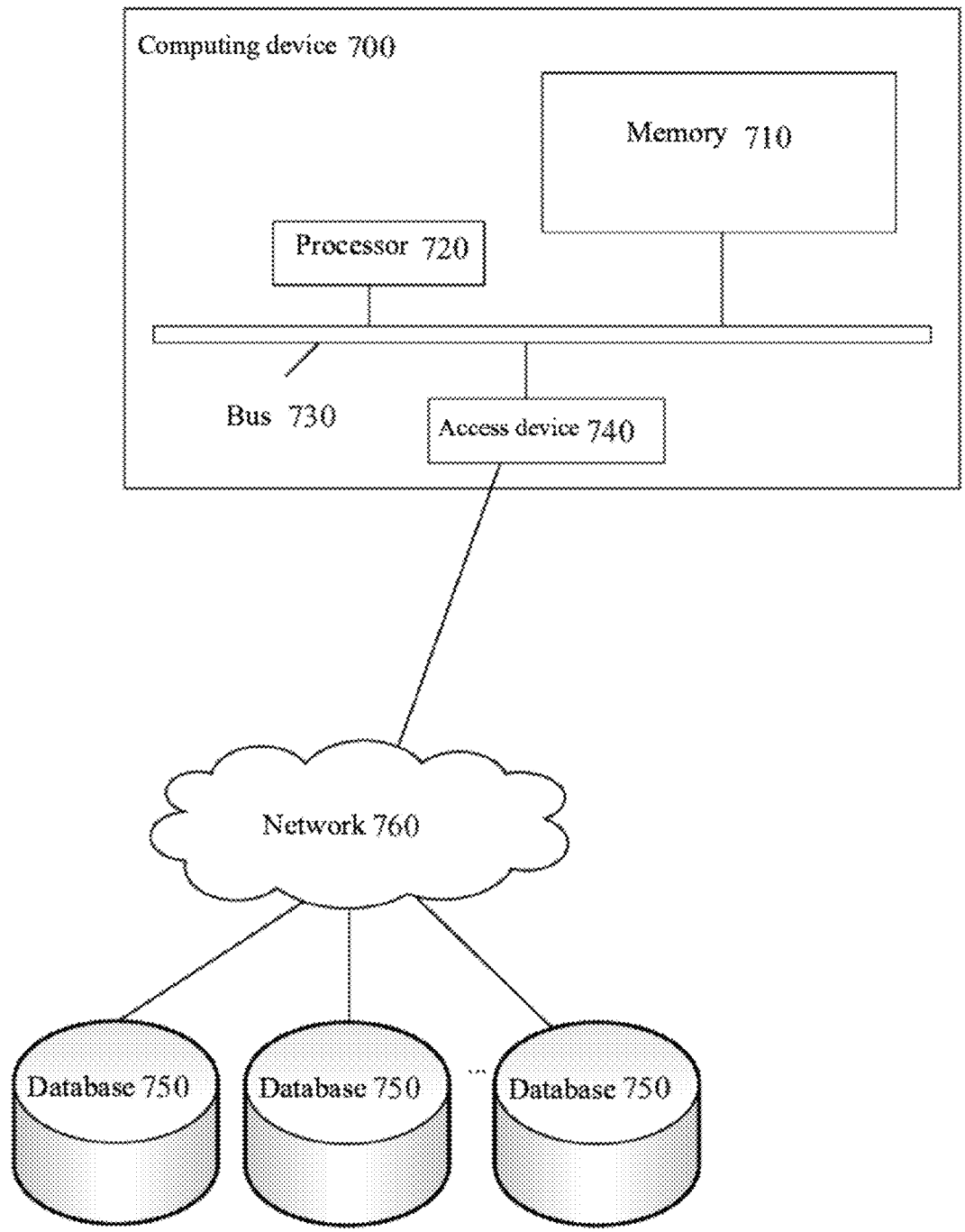
FIG. 7 is a structural block diagram of a computing device according to an embodiment of the present application.

FIG. 7 is a structural block diagram of a computing device 700 according to an embodiment of the present application. Components of the computing device 700 include, but are not limited to, a memory 710 and a processor 720. The processor 720 is connected to the memory 710 through a bus 730, and a database 750 is configured to store data.

The computing device 700 further includes an access device 740. The access device 740 enables communication of the computing device 700 via one or more networks 760. Examples of the networks include a public switched telephone network (PSTN), a local area network (LAN), a wide area network (WAN), a personal area network (PAN), or a combination of communication networks such as the Internet. The access device 740 may include one or more of any types of wired or wireless network interface (e.g., a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near-field communication (NFC) interface.

In an embodiment of the present application, the foregoing components of the computing device 700 and other components not shown in FIG. 7 may also be connected to each other, e.g., through a bus. It should be understood that the structural block diagram of the computing device shown in FIG. 7 is merely an example, instead of limiting the scope of the present application. Those skilled in the art can add or replace other components as required.

The computing device 700 may be any type of stationary or mobile computing device, including a mobile computer or a mobile computing device (e.g., a tablet computer, a personal digital assistant, a laptop computer, a notebook computer, a netbook, etc.), a mobile phone (e.g., a smartphone), a wearable computing device (e.g., a smart watch, smart glasses, etc.), or other types of mobile devices, or a stationary computing device such as a desktop computer or a PC. The computing device 700 may alternatively be a mobile or stationary server.

The processor 720 is configured to execute the following computer-executable instructions to implement the operation steps of any one of the marker generation method or the object presentation method.

The foregoing description is a schematic solution of the computing device of this embodiment. It should be noted that the technical solution of the computing device belongs to the same concept as the technical solution of the foregoing marker generation method or the object presentation method. For details that are not further described in the technical solution of the computing device, refer to the descriptions of the technical solution of the foregoing marker generation method or the object presentation method.

An embodiment of the present application further provides a computer-readable storage medium storing computer-executable instructions. When the computer-executable instructions are executed by a processor, the operation steps of any one of the foregoing marker generation method or the object presentation method are implemented.

The foregoing description is a schematic solution of the computer-readable storage medium of this embodiment. It should be noted that the technical solution of the storage medium belongs to the same concept as the technical solution of the foregoing marker generation method or the object presentation method. For details that are not further described in the technical solution of the storage medium, refer to the descriptions of the technical solution of the foregoing marker generation method or the object presentation method.

Specific embodiments of the present application are described above. Other embodiments are within the scope of the appended claims. In some cases, the actions or steps recited in the claims can be performed in an order different from that in the embodiments, and can still achieve desired results. In addition, the processes depicted in the figures are not necessarily required to be shown in a particular or sequential order, to achieve desired results. In some implementations, multi-task processing and parallel processing are also possible or may be advantageous.

The computer instructions include computer program code, which may be in a source code form, an object code form, an executable file form, some intermediate forms, etc. The computer-readable medium may include: any entity or apparatus that can carry the computer program code, such as a recording medium, a USB flash drive, a removable hard disk, a magnetic disk, an optical disc, a computer memory, a read-only memory (ROM), a random access memory (RAM), an electrical carrier signal, a telecommunications signal, and a software distribution medium. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be noted that, for ease of description, the foregoing method embodiments are described as a series of action combinations. However, persons skilled in the art should understand that the disclosure is not limited to the described action order, because according to the disclosure, some steps may be performed in another order or simultaneously. Moreover, those skilled in the art should also understand that the embodiments described in the specification all are preferred embodiments, and the involved actions and modules are not necessarily required by the disclosure.

In the foregoing embodiments, the embodiments are described with different emphases, and for a part which is not detailed in an embodiment, reference can be made to the related description of the other embodiments.

The preferred embodiments of the present application disclosed above are merely provided to help illustrate the present application. Optional embodiments are not intended to exhaust all details, nor do they limit the invention to only the described specific implementations. Apparently, many modifications and variations may be made in light of the content of the present application. In the present application, these embodiments are selected and specifically described to provide a better explanation of the principles and practical applications of the present application, so that those skilled in the art can well understand and utilize the present application. The present application should be defined only by the claims, and the full scope and equivalents thereof.

What is claimed is:

1. A method of generating augmented reality resources and corresponding trigger markers, comprising:
    generating and storing at least one augmented reality resource corresponding to at least one predetermined object;
    determining that at least one target object comprised in an object order, wherein the at least one target object is among the at least one predetermined object;
    determining at least one storage address of at least one augmented reality resource corresponding to the at least one target object; and
    generating, based at least in part on the at least one storage address, a trigger marker corresponding to the object order, wherein the trigger marker is configured to indicate for a client computing device to present at least one augmented reality image of the at least one target object based on the trigger marker, wherein the trigger marker carries an activation code;
    wherein the method further comprises:
    receiving a request for obtaining the at least one augmented reality resource corresponding to the at least one target object, wherein the request comprises the activation code and the at least one storage address;
    determining whether the obtaining request is verified based on the activation code;
    obtaining the at least one augmented reality resource based on the at least one storage address in response to determining that the request is verified, wherein the at least one augmented reality resource comprises a plurality of augmented reality resources;
    generating an augmented reality resource set by combining the plurality of augmented reality resources into the augmented reality resource set; and
    transmitting the augmented reality resource set to a requester that sent the request.

2. The method of claim 1, wherein the generating and storing at least one augmented reality resource corresponding to at least one predetermined object further comprises:
    generating a three-dimensional model for the at least one predetermined object, and obtaining a two-dimensional image corresponding to a key point of the three-dimensional model;
    identifying the three-dimensional model and the two-dimensional image as the at least one augmented reality resource corresponding to the at least one predetermined object; and
    storing the at least one augmented reality resource corresponding to the at least one predetermined object.

3. The method of claim 2, wherein the obtaining a two-dimensional image corresponding to a key point of the three-dimensional model further comprises:

splitting the three-dimensional model to a plurality of layers in a depth direction, wherein the plurality of layers comprises at least one key point;

determining the key point of the three-dimensional model in the depth direction, wherein the key point is among the at least one key point; and obtaining a two-dimensional image corresponding to the key point.

4. The method of claim 2, wherein the at least one predetermined object comprises a plurality of predetermined objects; and wherein the generating a three-dimensional model for the at least one predetermined object further comprises:

determining common information of the plurality of predetermined objects based on presentation images of the plurality of predetermined objects;

generating, based on the common information, a three-dimensional reference template corresponding to the plurality of predetermined objects; and generating a three-dimensional model corresponding to each of the plurality of predetermined objects based on the three-dimensional reference template and characteristic information of each of the plurality of predetermined objects.

5. The method of claim 1, wherein the generating, based at least in part on the at least one storage address, a trigger marker corresponding to the object order further comprises:

configuring the activation code for the object order; and generating the trigger marker corresponding to the object order based on the at least one storage address and the activation code.

6. The method of claim 1, wherein the determining whether the request is verified based on the activation code further comprises:

querying a preset database for the activation code to determine whether there is a target user account corresponding to the activation code;

in response to determining that the target user account does not exist in the preset database, determining that the request is verified, and storing an association between the activation code and a user account that initiates the request; and in response to determining that the target user account exists in the preset database, determining whether the user account that initiates the request is the same as the target user account, and determining that the request is verified based on determining that the user account is the same as the target user account.

7. A method of presenting augmented reality images of objects, comprising:

in response to scanning a preset trigger marker corresponding to an object order, sending a request for an augmented reality resource set;

receiving the augmented reality resource set, wherein the augmented reality resource set comprises augmented reality resources corresponding to all target objects in the object order;

in response to scanning a first object, obtaining a first augmented reality resource corresponding to the first object from the augmented reality resource set, wherein the first object is any one of the target objects;

generating an augmented reality image of the first object based on the first object and the first augmented reality resource corresponding to the first object;

presenting the augmented reality image of the first object;

wherein the preset trigger marker carries an activation code and storage addresses of the augmented reality resources corresponding to the target objects, and wherein the method further comprises:

in response to scanning the preset trigger marker corresponding to the object order, obtaining the activation code and the storage addresses from the preset trigger marker;

sending the request for the augmented reality resource set, wherein the request comprises the activation code and the storage addresses; and receiving the augmented reality resource set returned based on the storage addresses when the request is verified.

8. The method of claim 7, further comprising:

in response to scanning a second object, obtaining a second augmented reality resource corresponding to the second object from the augmented reality resource set, wherein the second object is any one of the target objects which is different from the first object; and generating an augmented reality image of the second object based on the second object and the second augmented reality resource corresponding to the second object; and presenting the augmented reality image of the second object.

9. The method of claim 7, wherein the first augmented reality resource comprises a three-dimensional model of the first object and a two-dimensional image corresponding to a key point of the three-dimensional model; and wherein the method further comprises:

determining a presentation image of the first object;

generating the augmented reality image of the first object by rendering the three-dimensional model of the first object based on the presentation image and the two-dimensional image corresponding to the key point of the three-dimensional model; and presenting the augmented reality image of the first object at a presentation location associated with the first object.

10. The method of claim 9, wherein the generating the augmented reality image of the first object further comprises:

determining an orthographic projection face of the three-dimensional model;

rendering the presentation image of the first object on the orthographic projection face; and rendering, at the key point, the two-dimensional image corresponding to the key point of the three-dimensional model.

11. The method of claim 7, wherein each augmented reality resource comprised in the augmented reality resource set carries an object identifier corresponding to each of the target objects; and wherein the obtaining a first augmented reality resource corresponding to the first object from the augmented reality resource set further comprises:

performing image recognition on the first object to determine a presentation image of the first object image;

determining an object identifier of the first object based on the presentation image; and obtaining the first augmented reality resource corresponding to the first object from the augmented reality resource set based on the object identifier of the first object.

12. A system, comprising:

at least one processor; and at least one memory communicatively coupled to the at least one processor and comprising computer-readable instructions that upon execution by the at least one processor cause the at least one processor to perform operations comprising:
  generating and storing at least one augmented reality resource corresponding to at least one predetermined object;
  determining that at least one target object comprised in an object order, wherein the at least one target object is among the at least one predetermined object;
  determining at least one storage address of at least one augmented reality resource corresponding to the at least one target object; and
  generating, based at least in part on the at least one storage address, a trigger marker corresponding to the object order, wherein the trigger marker is configured to indicate for a client computing device to present at least one augmented reality image of the at least one target object based on the trigger marker, wherein the trigger marker carries an activation code;
  wherein the operations further comprise:
  receiving a request for obtaining the at least one augmented reality resource corresponding to the at least one target object, wherein the request comprises the activation code and the at least one storage address;
  determining whether the obtaining request is verified based on the activation code;
  obtaining the at least one augmented reality resource based on the at least one storage address in response to determining that the request is verified, wherein the at least one augmented reality resource comprises a plurality of augmented reality resources;
  generating an augmented reality resource set by combining the plurality of augmented reality resources into the augmented reality resource set; and
  transmitting the augmented reality resource set to a requester that sent the request.

13. The system of claim 12, wherein the generating and storing at least one augmented reality resource corresponding to at least one predetermined object further comprises:
  generating a three-dimensional model for the at least one predetermined object, and obtaining a two-dimensional image corresponding to a key point of the three-dimensional model;
  identifying the three-dimensional model and the two-dimensional image as the at least one augmented reality resource corresponding to the at least one predetermined object; and
  storing the at least one augmented reality resource corresponding to the at least one predetermined object.

14. The system of claim 13, wherein the obtaining a two-dimensional image corresponding to a key point of the three-dimensional model further comprises:
  splitting the three-dimensional model to a plurality of layers in a depth direction, wherein the plurality of layers comprises at least one key point;
  determining the key point of the three-dimensional model in the depth direction, wherein the key point is among the at least one key point; and
  obtaining a two-dimensional image corresponding to the key point.

15. The system of claim 13, wherein the at least one predetermined object comprises a plurality of predetermined objects; and wherein the generating a three-dimensional model for the at least one predetermined object further comprises:
  determining common information of the plurality of predetermined objects based on presentation images of the plurality of predetermined objects;
  generating, based on the common information, a three-dimensional reference template corresponding to the plurality of predetermined objects; and
  generating a three-dimensional model corresponding to each of the plurality of predetermined objects based on the three-dimensional reference template and characteristic information of each of the plurality of predetermined objects.

16. The system of claim 12, wherein the generating, based at least in part on the at least one storage address, a trigger marker corresponding to the object order further comprises:
  configuring the activation code for the object order; and
  generating the trigger marker corresponding to the object order based on the at least one storage address and the activation code.

17. The system of claim 12, wherein the determining whether the request is verified based on the activation code further comprises:
  querying a preset database for the activation code to determine whether there is a target user account corresponding to the activation code;
  in response to determining that the target user account does not exist in the preset database, determining that the request is verified, and storing an association between the activation code and a user account that initiates the request; and
  in response to determining that the target user account exists in the preset database, determining whether the user account that initiates the request is the same as the target user account, and determining that the request is verified based on determining that the user account is the same as the target user account.

* * * * *